(12) United States Patent
Crowe

(10) Patent No.: US 6,419,062 B1
(45) Date of Patent: Jul. 16, 2002

(54) FRICTION CLUTCH

(75) Inventor: Stuart Crowe, Bubbenhall (GB)

(73) Assignee: AP Racing Limited, Leamington Spa (GB)

(*) Notice: Subject to any disclaimer, the term of this patent is extended or adjusted under 35 U.S.C. 154(b) by 0 days.

(21) Appl. No.: 09/608,422

(22) Filed: Jun. 30, 2000

(30) Foreign Application Priority Data

Jul. 1, 1999 (GB) ............................................. 9915344

(51) Int. Cl.⁷ ........................... F16D 13/70; F16D 13/56
(52) U.S. Cl. ............... 192/52.6; 192/89.23; 192/107 M; 192/109 A
(58) Field of Search ............................... 192/52.3, 52.6, 192/70.14, 89.26, 107 R, 107 M, 109 A, 109 B, 113.4, 89.23

(56) References Cited

U.S. PATENT DOCUMENTS

| | | | | |
|---|---|---|---|---|
| 1,632,526 A | * | 6/1927 | Willgoos | 192/109 B X |
| 2,050,426 A | * | 8/1936 | Dolan | 192/52.6 X |
| 2,251,366 A | * | 8/1941 | Miller et al. | 192/109 A X |
| 2,341,747 A | | 2/1944 | Vincent | 192/109 B |
| 2,587,141 A | * | 2/1952 | Grandgirard | 192/109 A X |
| 2,639,013 A | * | 5/1953 | Meschia | 192/10 B X |
| 3,181,670 A | * | 5/1965 | Leive | 192/109 A X |
| 4,618,049 A | * | 10/1986 | Pflaum et al. | 192/107 M |
| 4,830,164 A | * | 5/1989 | Hays | 192/107 R |
| 5,092,440 A | * | 3/1992 | Nakano | 192/70.14 X |
| 5,184,704 A | * | 2/1993 | Hays | 192/70.14 |
| 5,505,286 A | | 4/1996 | Nash | 192/52.1 |
| 5,727,665 A | * | 3/1998 | Gonia et al. | 192/70.14 |

FOREIGN PATENT DOCUMENTS

| | | |
|---|---|---|
| EP | 0797016 A2 | 9/1997 |
| GB | 2175655 A | 12/1986 |
| WO | WO 93/07400 A1 * | 4/1993 |

* cited by examiner

*Primary Examiner*—Rodney H. Bonck
(74) *Attorney, Agent, or Firm*—Paul E Milliken; Ray L Weber

(57) ABSTRACT

A friction clutch (10) having a device to cushion engagement of the clutch, the cushioning device comprising at least one resilient device (26) arranged in a recesses (28) in a first component (11) of the clutch and which acts to bias a second component (19*a*) of the cushioning. The or each resilient device is arranged to act on the second component via an insert (37) mounted in a recess (38) in the second component. The or each resilient device may comprise a pair of back-to-back belleville washers (27*a*, 27*b*) which are held in the recess in the first component by a bolt (30) which engages with a pillar (29) in the centre of the recess. An outer edge of the outermost washer (27*b*) protrudes from the recess to engage with the second componet.

39 Claims, 8 Drawing Sheets

FRICTION CLUTCH

The present invention relates to friction clutches for motor vehicles and in particular for use in cars and motorcycles, more particularly racing cars and motorcycles.

The type of friction clutches used in racing cars and motorcycles are such that clutch travel between a clutch release position and a clutch engaged position is very small. This in effect means that clutch engagement is very sudden and sharp.

It is known to reduce the sudden engagement of a clutch by providing cushioning in the force path between the clutch engagement spring means and the flywheel or reaction plate of the clutch. For example the applicant's prior patent WO 93/07400 discloses a friction clutch for a motor vehicle in which an annular plate coaxial and rotationally fast with the flywheel is biased away from the flywheel to provide axial cushioning of the clutch engagement.

The present invention seeks to further improve such friction clutches.

It is also and objective of the present invention to provide an axially cushioned clutch which is simpler and cheaper to produce than prior art axially cushioned clutches.

It is a further objective to provide and axially cushioned clutch in which the cushioning characteristics can be set or adjusted more reliably and/or more quickly than with the known axially cushioned clutches.

According to a first aspect of the invention there is provided a friction clutch having means to cushion engagement of the clutch, the cushioning means comprising at least one resilient means arranged in a recesses in a first component of the clutch, the at least one resilient means acting to bias a second component of the clutch away from the first component to provide the cushioning, characterised in that the or each resilient means is arranged to act on the second component via an insert mounted in a recess in the second component.

The first aspect of the invention provides a cushioned clutch which is axially compact since the resilient means is located in a recess in the first component and the insert is located in a recess in the second component. The invention provides a particularly compact arrangement when applied to a multi-plate clutch in which the second component is one of the drive plates. More particularly, the invention may be applied to a multi-plate clutch in which the drive and driven plates are made from a carbon/carbon matrix material in which direct contact between the resilient means and one of the driven plates would be liable to result in the driven plate being damaged. The use in these circumstances of an insert arranged in a recess in the driven plate provides a means of preventing direct contact between the resilient means and the drive plate without increasing or only minimally increasing the overall axial dimensions of the clutch.

According to a second aspect of the invention there is provided a friction clutch having means to cushion engagement of the clutch, the cushioning means comprising a plurality of circumferentially spaced resilient means arranged in one or more recesses in a first component of the clutch, each resilient means comprising a stack of two or more belleville washers with a portion of the outermost washer of the stack protruding from the recess when the clutch is disengaged for contact with a second component of the clutch to provide the cushioning, characterised in that each stack of washers is located on the first component by a respective fastener which determines the axial position of the washers in the recess such that with the clutch disengaged the portion of the outermost washer protrudes from the recess by a predetermined amount.

A friction clutch in accordance with the second aspect advantageously provides axial cushioning with a minimum of moving parts whilst positively retaining the resilient means on the first component in a manner which simplifies assembly of the clutch and which can enable adjustment of the cushioning characteristics. In particular the arrangement has no relatively sliding components which may be liable to stick in use.

According to a third aspect of the invention, there is provided a friction clutch having means to cushion engagement of the clutch, the cushioning means comprising a plurality of circumferentially spaced resilient means located in one or more recesses in a first component of the clutch and arranged to bias a second component of the clutch axially away from the first to provide the cushioning, characterised in that each resilient means is held in its recess by a fastener carrying an axial abutment means for co-operation with its respective resilient means, the position of the axial abutment means relative to the base of the recess being determined by engagement of a stop on the fastener with corresponding stop on the first component such that when the stop on the fastener is fully tightened against the stop on the first component, the resilient means provides a predetermined cushioning pre-load.

This aspect of the invention advantageously provides for a simplified assembly of the friction clutch wherein the fasteners which locate the resilient means are fully tightened until the stop on the fastener engages with the stop on the first component. This ensures that the position of the axial abutment means on the fastener relative to the base of the recess or the resilient means is the same for each resilient means and so ensures that each resilient means is subjected to the same degree of compression without the need for the mechanic to carefully monitor the position of the axial abutment means relative to the base of the recess or the resilient means.

In a preferred embodiment, each resilient means in a clutch according to the third aspect may comprise a stack of two or more belleville washers in accordance with the second aspect. This provides a combination of the advantages of both the second and third aspects.

Further advantageous arrangements are defined in the various dependent claims.

The invention will now be described by way of example only with reference to the following drawings in which.

Figure 1:
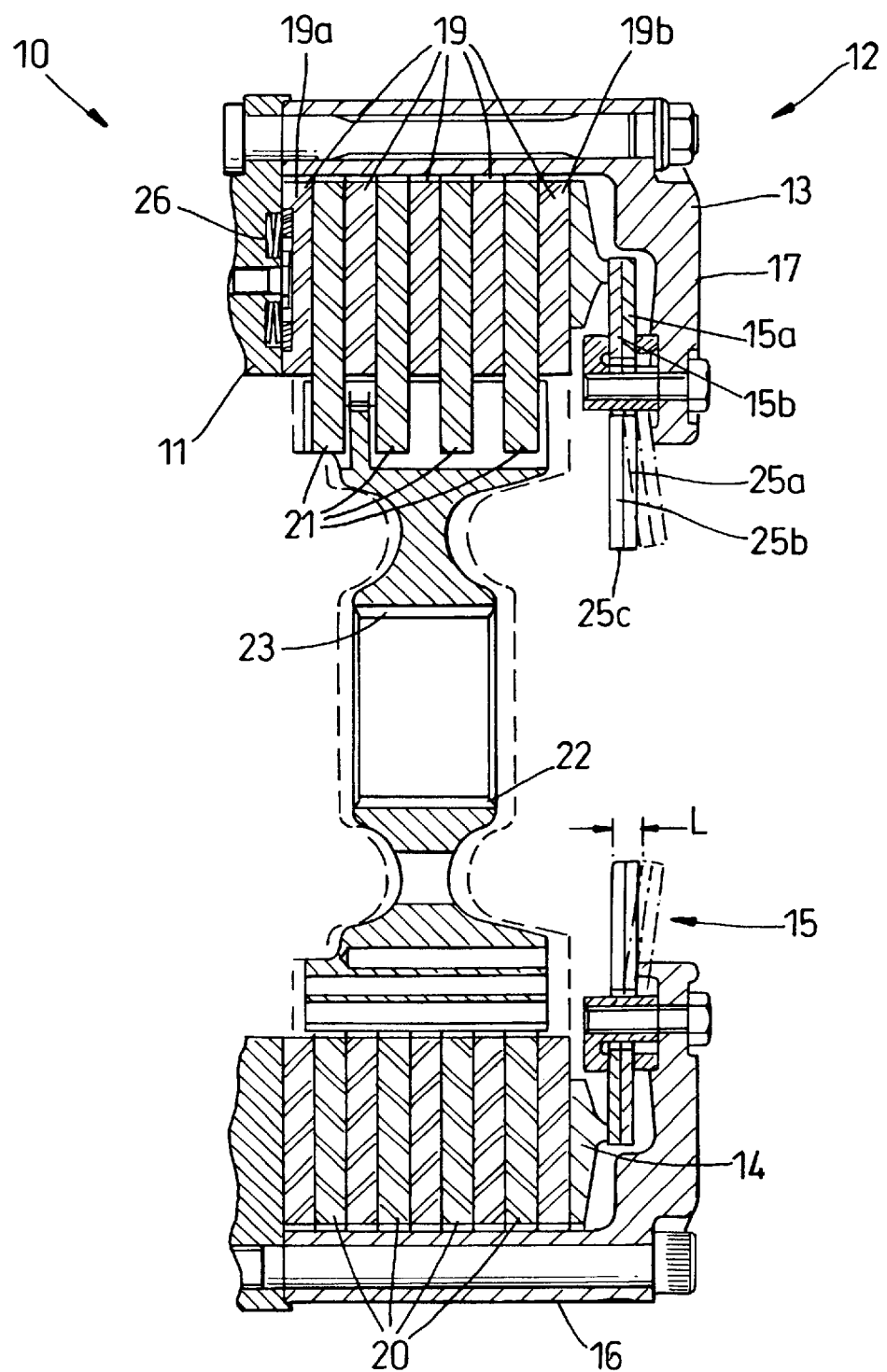
FIG. 1 is a cross section through a first embodiment of a multi-plate clutch according to the invention.
Figure 6:
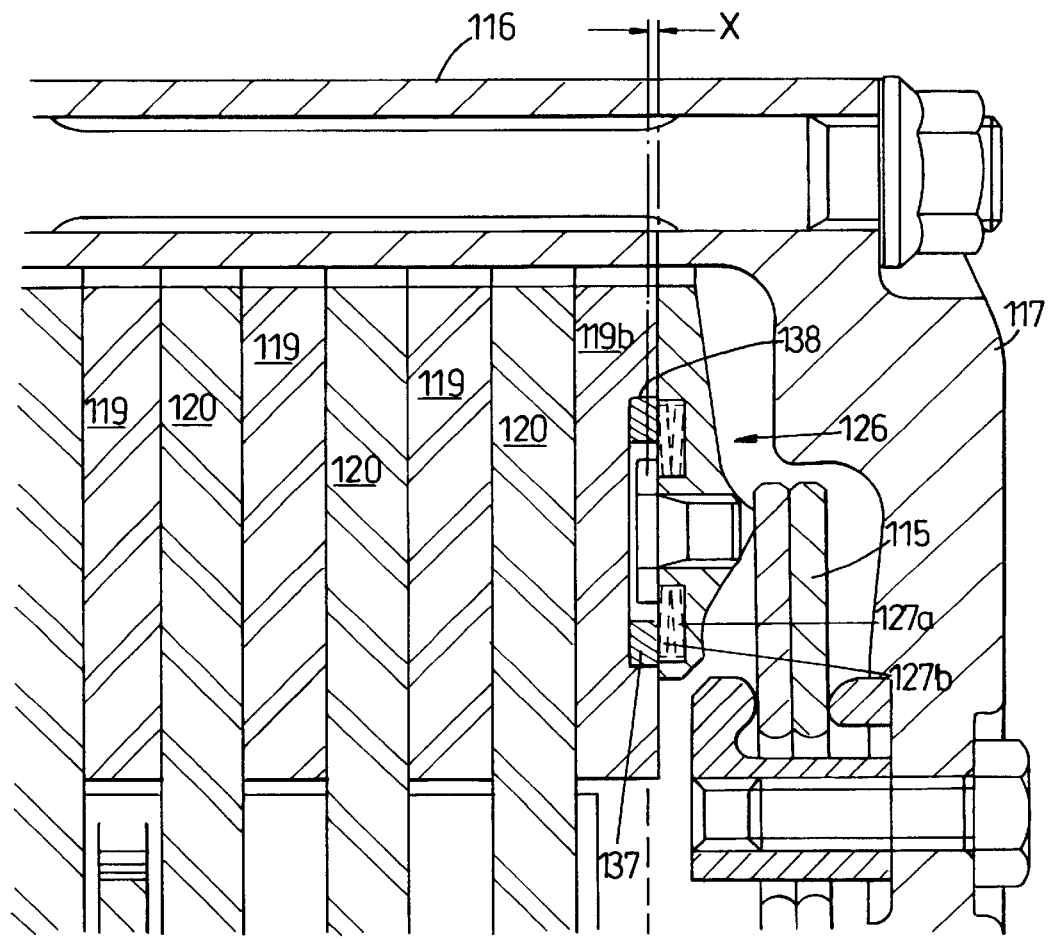
Figure 5:
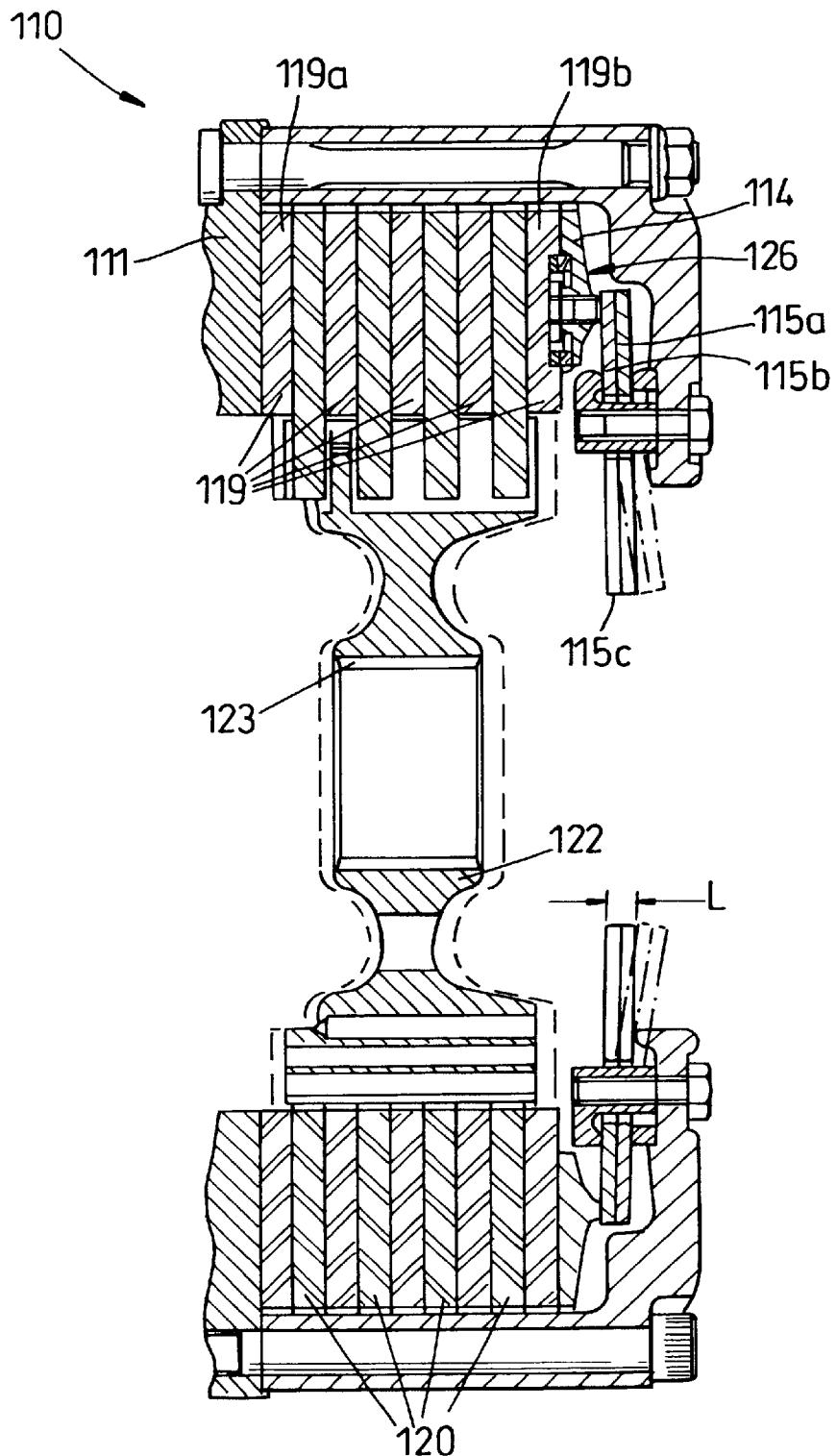
Figure 7:
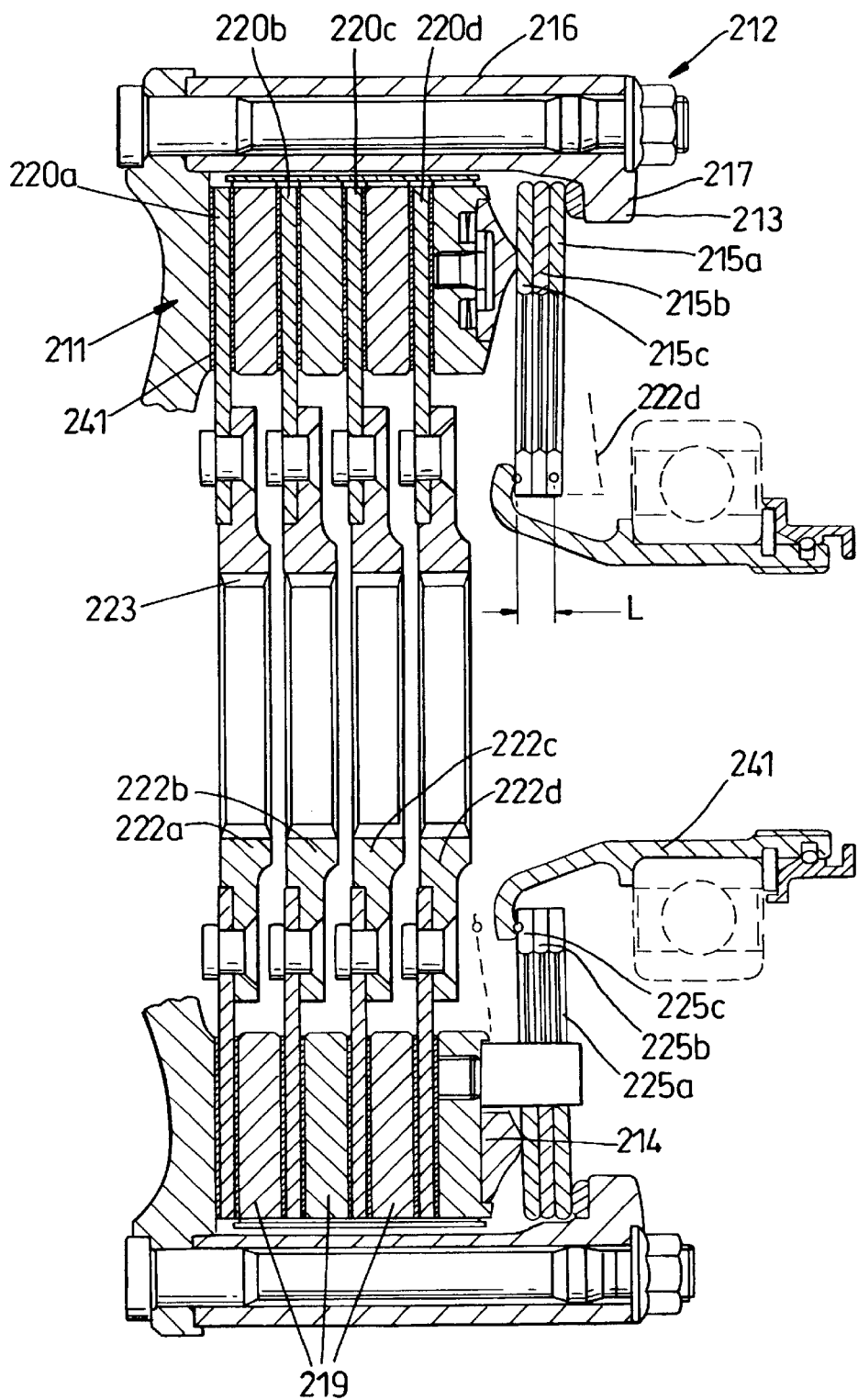
Figure 8:
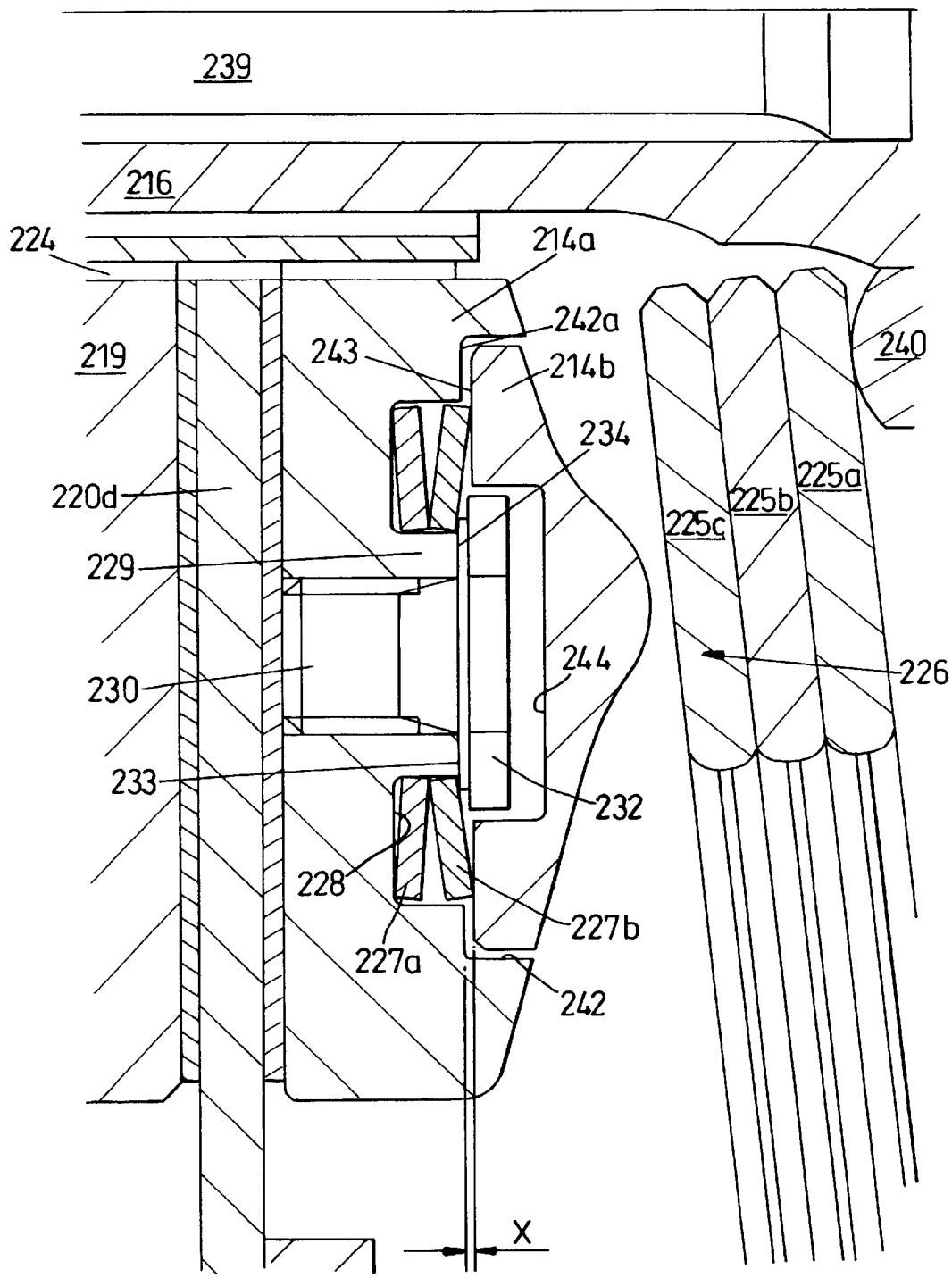
Figure 9:
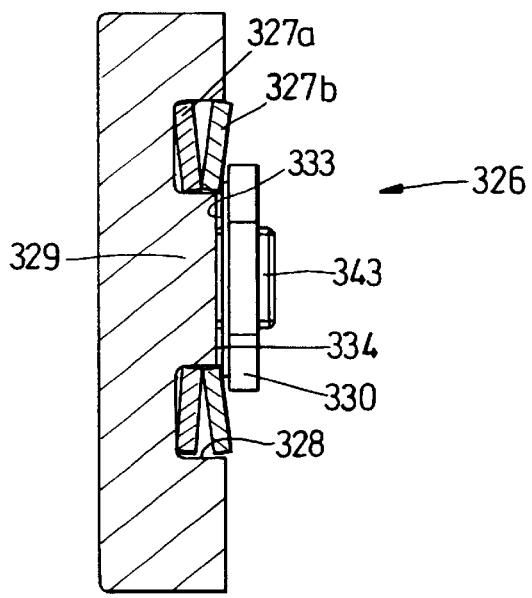
Figure 10:
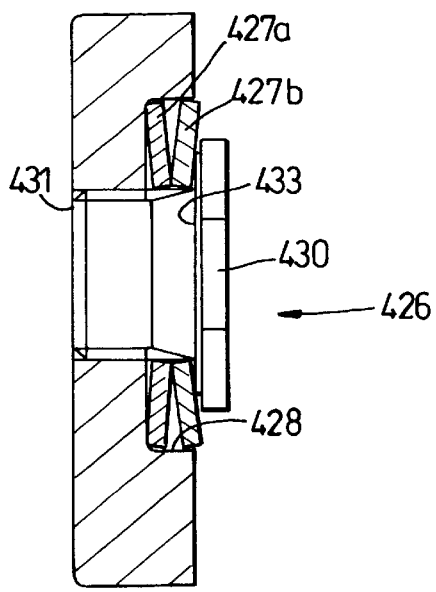
Figure 11:
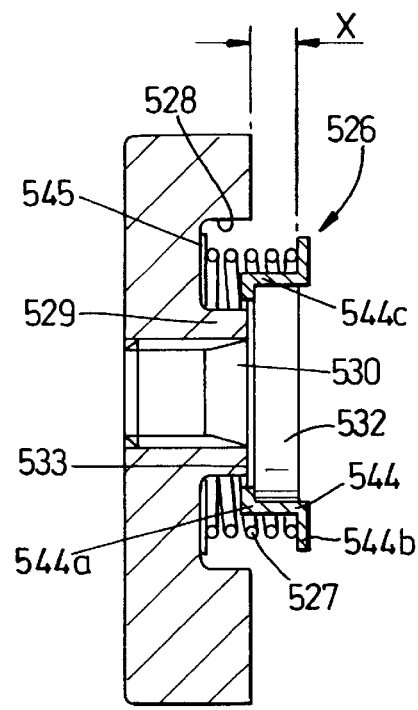

FIG. 5 is a view similar to that of FIG. 1 showing a second embodiment of a multiplate clutch according to the invention; and FIG. 6 is an enlargement of a detail of FIG. 5; and FIG. 7 Is a view similar to that of FIG. 1 showing a third embodiment of a multi-plate clutch in accordance with the invention; and FIG. 8 is an enlargement of a detail of FIG. 7; and FIGS. 9 to 11 each show a modified resilient means for use in a clutch according to the invention.

Figure 2:
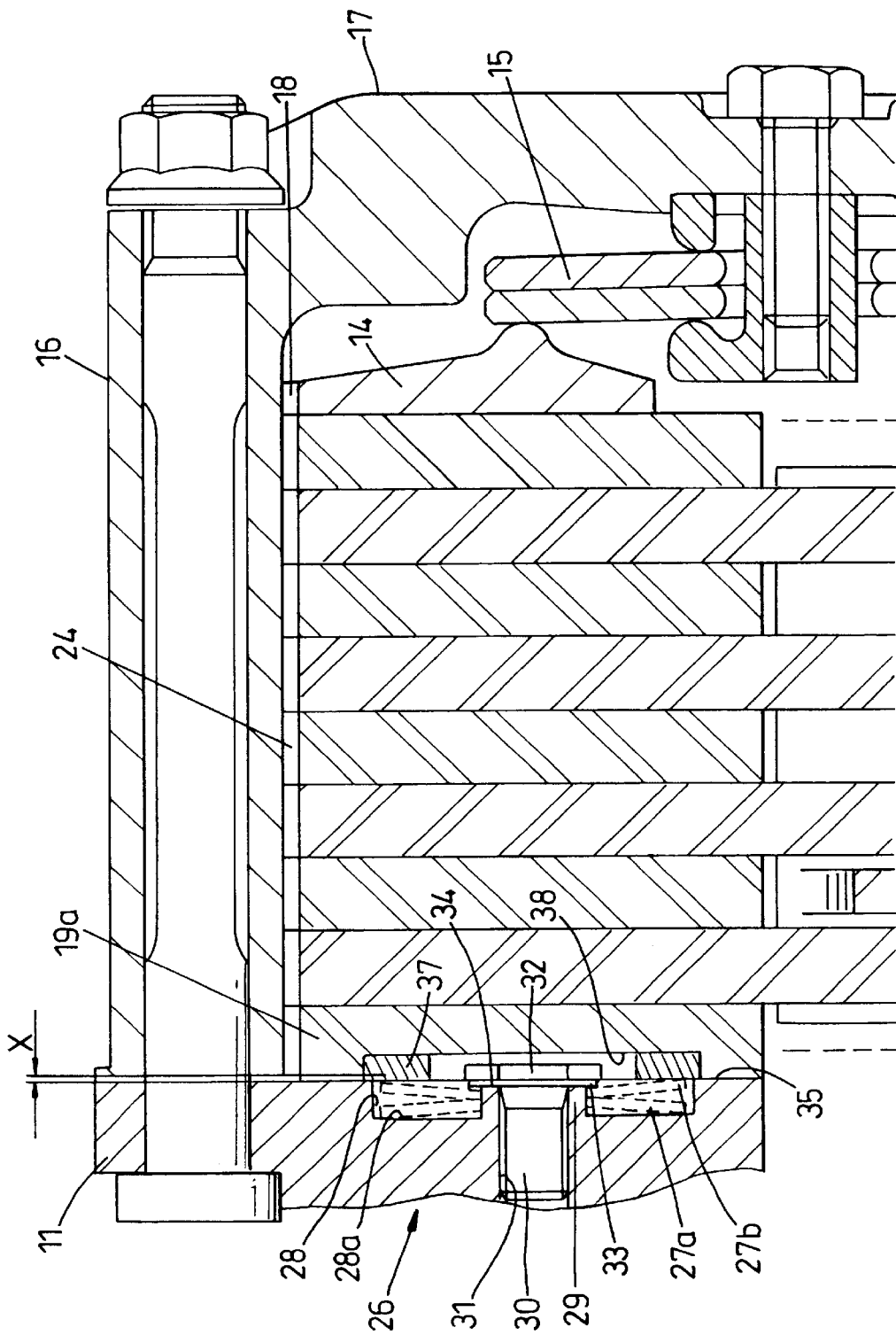
FIG. 2 is an enlargement of a detail from FIG. 1.
Figure 3:
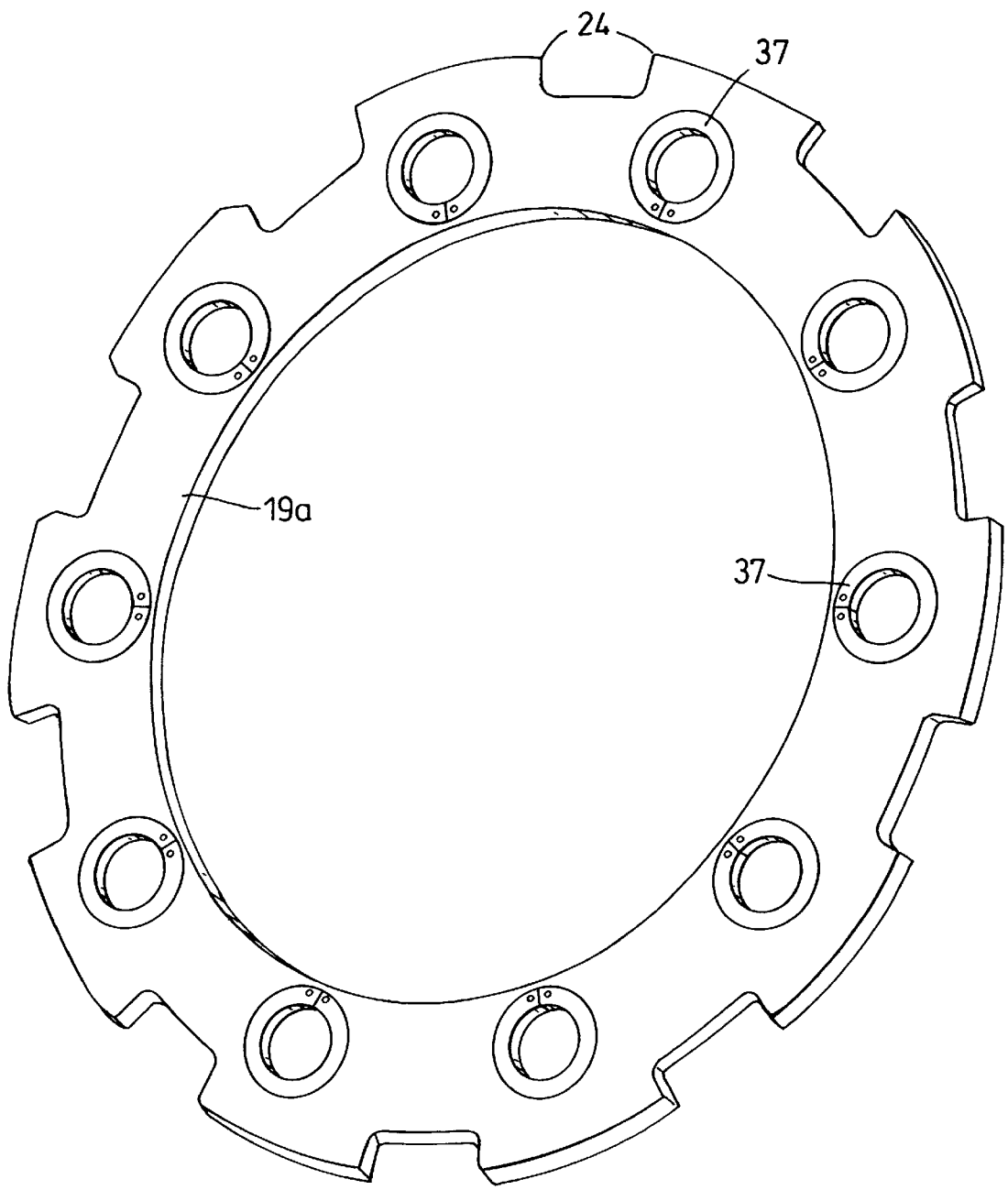
FIG. 3 is an isometric view of a drive plate of the clutch of FIG. 1 showing a plurality of circumferentially spaced inserts mounted in corresponding recesses in the drive plate.

With reference to FIGS. 1 to 3 there is illustrated a multi-plate friction clutch 10 of the type used in racing cars and motorcycles. The friction clutch 10 includes a reaction plate in the form of a flywheel 11 fixed to the crankshaft (not shown) of an engine and a cover assembly 12 comprising a cover 13 bolted to the flywheel 11, a pressure plate 14 and a diaphragm spring means 15 secured to the cover 13 and which is arranged to bias the pressure plate 14 towards the flywheel 11. The cover 13 comprises a plurality of axially extending arm portions 16 and a generally radially extending annular end portion 17 on which the diaphragm spring means 15 is mounted. The pressure plate 14 is held rotationally fast with the cover 13 by means of outer radial teeth 18 which engage with the arm portions 16.

Between the pressure plate 14 and the flywheel 11 there is arranged a stack of interleaved drive 19 and driven 20 plates. The driven plates 20 have inner radial teeth 21 that engage a central hub 22 so as to be rationally fixed to the hub. The hub 22 has internal splines 23 for connection with a shaft (not shown) of an associated transmission. The drive plates 19 have outer radial teeth 24 that engage the arm portions 16 of the clutch cover 13 so as to be rotationally fast with the clutch cover 13 and the flywheel 11 but capable of movement in an axial direction relative thereto.

As is known in the art, the diaphragm spring means 15 biases the pressure plate 14 towards the flywheel 11 clamping the drive 19 and driven 20 plates between the pressure plate 14 and flywheel 11 to permit drive to be transmitted from the flywheel 11 to the transmission shaft.

In the embodiment shown, the diaphragm spring means 15 comprises two diaphragm springs 15*a*, 15*b* arranged axially side-by-side. Each diaphragm spring 15*a*, 15*b* is a frustro-conical spring comprising a radially outer annular portion having a plurality of radially inwardly extending spaced fingers 25*a*, 25*b* thereon. The springs are coned away from the flywheel 11.

The drive plate 19*a* axially closest to the flywheel 11 is biased away from the flywheel by a plurality of resilient means 26 circumferentially spaced around the flywheel 11. There are ten such resilient means 26 in the embodiment disclosed but the precise number used is not essential to the invention and can be varied as required to suit a particular clutch.

Each resilient means 26 comprises two back to back belleville washers 27*a*, 27*b* located in an annular recess 28 in the flywheel 11. The centre of the annular recess 28 comprises a pillar 29 and the belleville washers 27*a*, 27*b* are held in position by a bolt 30 which is in screw threaded engagement with a bore 31 formed in the pillar 29. The head 32 of the bolt 30 has a lower surface 33 which fits flush against axial face 34 of the pillar when the bolt 30 is fully tightened. The surface 33 effectively provides a stop which engages with the axial end face 34 of the pillar. The surface 33 extends over a radially inner portion of the annular recess 28 to provide an abutment surface to hold the radially inner edges of the belleville washers 27*a*, 27*b* in the recess in a desired position such that when the clutch is disengaged the radially outer edge of washer 27*b* extends beyond the axial face 35 of the flywheel by an amount X which is typically less than 0.5 mm.

The dimensions of the recess 28, the height of the pillar 29, and the characteristics of the washers 27*a*, 27*b* are selected to provide the desired cushioning characteristics for the clutch. For example the dimensions can be selected so that on assembly the washers 27*a*, 27*b* are compressed slightly to give a desired pre-load.

Furthermore, it is possible to vary the cushioning characteristics during assembly by selecting washers 27*a*, 27*b* with appropriate spring characteristics or by the use of shims (not shown) in the base 28*a* of the recess to vary the distance between the abutment surface 33 and the effective base of the recess 28. It will be understood that when a shim or shims are placed in the base of the recess, the outer surface of the shims effectively becomes the base of the recess so that the distance between the abutment surface 33 and the effective base of the recess is dependant on the thickness of the shims. By selecting shims of a suitable thickness, the cushioning pre-load can be varied to suit the application or driver preference. References in the claims to the base of the recess should be understood in this context to encompass the actual base 28*a* of the recess or the outer surface of the shims when shims are used.

The shims can also serve to stop the washer 27*a* from digging into the flywheel 11, particularly when the flywheel is made from a relatively soft material such as aluminium. The radially outer edge of belleville washer 27*b* contacts the driven plate 19*a* via a corresponding annular insert 37 located in a circular recess 38 in the drive plate 19*a*. The insert 37 spreads the load that the washers 27*a*, 27*b* apply to the drive plate 19*a*. This is necessary since the material properties of the carbon/carbon dive plate 19*a* are such that direct contact between the washer 27*b* and the drive plate would be liable to result in damage occurring to the drive plate. Each insert 37 is preferably made from a material having a low thermal conductivity, typically less than 20 W/M.K, such as stainless steel and as can best be seen in FIG. 3 is in the form of a split ring which expands to grip the edge of the recess 38.

By forming the insert 37 as an annular split ring, the mass of the insert can be kept to a minimum and expansion of the insert due to heat can be accommodated by the split which reduces the risk of damage occurring to the drive disk as the insert expands. Furthermore, because the insert has a low thermal conductivity, conduction of heat from the drive disk 19*a* to the belleville washers is reduced which helps to protect the washers from the effects of the heat generated in the clutch.

Operation of the clutch 10 will now be described.

When a clutch release bearing (not shown) applies a clutch release travel 'L' to the radially inner ends of the fingers 25*a*, 25*b* of the diagram springs 15*a*, 15*b* the clamp load exerted on the pressure plate 14 decreases and the pressure plate tends to move axially away from the flywheel as the radially inner ends of the spring fingers move axially inwardly to the solid line position 25*c*.

As the pressure plate 14 moves away from the flywheel 11, the bias of the resilient means 26 acting on the drive plate 19*a* tends to keep the stack of drive and driven plates clamped against the pressure plate 14 so that the clamping load on the driven plates 20 is slowly reduced until the drive plate 19*a* has moved away from the flywheel axially by a distance 'X', which is the maximum amount the belleville washer 27*b* extends beyond the face 25 of the flywheel. Thereafter the pressure plate 14 moves axially away from the drive plate 19*a* and the rate at which the clamp load is removed increases.

When the clutch is engaged the reverse sequence of events takes place. The pressure plate 14 comes into contact with the drive plate 19*b* axially furthest away from the flywheel which clamps the stack of drive and driven plates against the resilient means 26 which cushions the initial clamp load.

As the clamp load is increased the drive plate 19*a* moves towards the flywheel 11 against an increasing resistance from the resilient means 26, until the drive plate 19*a* abuts the flywheel 11.

Figure 4:
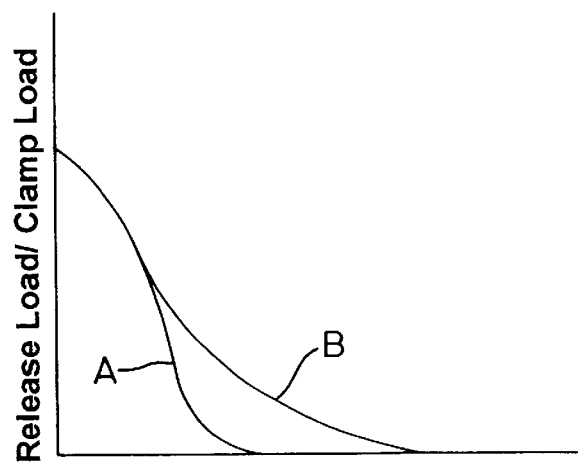
FIG. 4 is a graph of release load verses release bearing travel, and pressure plate lift for clutches without cushioning and clutches with cushioning.

The sequence of events is illustrated in FIG. 4 which is a graph of clamp load (i.e. the load on the driven plates)

versus release travel and pressure plate lift. Release travel is the distance moved by the release bearing during operation of the clutch. The curve A represents clamp load versus release travel for a typical racing, non-cushioned clutch. The curve B represents clamp load versus release travel for a clutch according to the present invention. It can be seen that as the release bearing moves from a position of maximum travel towards a position of minimum travel, i.e. during clutch engagement, the clamp load is applied to the driven plates more gradually in the initial stages of engagement in the case of curve 'B' than curve 'A'. This makes engagement of the clutch more easy to control particularly during race starts.

FIGS. 5 and 6 show a modified clutch 110. Components of clutch 110 which perform similar functions to those of clutch 10 are given the same reference numerals increased by 100.

Clutch 110 is essentially identical to clutch 10 except that in clutch 110 the resilient means 126 are provided in pressure plate 114 and engage inserts 137 mounted in recesses 138 in the drive plate 19b axially furthest from the flywheel 111. In all other respects the clutch 110 and the resilient means 126 are the same as clutch 10 and resilient means 26.

Operation of the clutch 110 will now be described.

When a clutch release bearing (not shown) applies a clutch release travel 'L' to the radially inner ends of the fingers 125a, 125b of the diagram springs 115a, 115b the clamp load exerted on the pressure plate 114 decreases and the pressure plate tends to move axially away from the flywheel as the radially inner ends of the spring fingers move axial inwardly to the solid line position 125c.

As the pressure plate 114 moves away from the flywheel 111, the bias of the resilient means 126 acting on the drive plate 119b tends keeps the stack of clutch drive 19 and driven plates clamped against the flywheel 111 so that the clamping load on the driven plates 120 is slowly reduced until the pressure plate 114 has moved axially away from the drive plate 119b by a distance 'X', which is the maximum amount the belleville washer 127b extends beyond the axial face 114a of the pressure plate 114. Thereafter the pressure plate 114 continues to move axially away from the drive plate 119b and the rate at which the clamp load is removed increases.

When the clutch is engaged the reverse sequence of events takes place. As the pressure plate 114 is biased towards the flywheel 111, the resilient means 126 is brought into contact with the drive plate 119b the stack of drive and driven plates is clamped against the flywheel 111 with the initial clamp load being cushioned by the resilient means 126.

As the diaphragm spring clamp load is increased the pressure plate 114 moves towards the drive plate 119b against an increasing resistance from the resilient means 126, until the pressure plate 114 abuts drive plate 119b fully clamping the drive and driven plates between itself and the flywheel 111.

FIGS. 7 and 8 show a further embodiment of a clutch 210 according to the invention. Components of clutch 210 which perform similar functions to those of clutch 10 are given the same reference numerals increased by 200.

Clutch 210 comprises a flywheel 211 which is attached to the crankshaft (not shown) of an associated engine (not shown). Attached to the flywheel by means of bolts 239 is a clutch cover assembly 212 comprising a cover 213, a pressure plate 214 and a diaphragm spring means 215. The cover 213 comprises a plurality axially extending arm portions 216 and an annular end face 217. In this embodiment the diaphragm spring means 215 comprises three diaphragms spring members 215a, 215b, 215c arranged axially side by side. The clutch 210 is a pull type clutch in which an outer diameter portion of the diaphragm spring means 215 abuts a pivot 240 on the annular end face 217 and contacts the pressure plate 214 at a point between the outer diameter and the inwardly directed spring fingers 225 to bias the pressure plate towards the flywheel. In this arrangement the clutch is released by a release bearing mechanism 241 which pulls the spring fingers 225 away from the flywheel 211 by an amount L.

Between the pressure plate 214 and the flywheel 211 are arranged a stack of drive 219 and driven 220 plates. The drive 219 and driven 220 plates are made from a metallic material such as steel and the driven plates 220 may be faced with a sintered metal 241. The drive plates 219 are rotationally fixed to the clutch cover by means of radially outwardly extending teeth or drive formations 224 which engage with the axially extending arm portions 216 of the clutch cover 213. There are four driven plates 220a, 220b, 220c, 220d, each of which is riveted to a respective hub member 222a, 222b, 222c, 222d. The hub members 222a, 222b, 222c,222d each have internal splines 223 for engagement with corresponding splines on an associated transmission shaft (not shown).

The pressure plate 214 comprises two parts, a main part 214a and an annular pivot ring 214b. The pivot ring 214b is received in an annular recess 242 formed in the axial face of the main part 214a which faces away from the flywheel 211.

Axial cushioning is provided between the pivot ring 214b and the main part 214a of the pressure plate to ensure smooth engagement. To this end a plurality circumferentially equi-spaced of resilient means 226 are provided. Each resilient means 226 is essentially the same as the resilient means 26 in clutch 10 with the stack of back to back belleville washers 227a, 227b being arranged in a respective recess 228 formed in the base 242a of the annular recess 242 which houses the pivot ring 214b. The outermost washer 227b projects from the base of the annular recess 242 to contact an axial face 243 of the pivot ring. A bolt 230 is in screw threaded engagement will a pillar 229 in the centre of the recess 228. A surface 233 on the head of the bolt acts as a stop for engagement with the axial end surface 234 of the pillar 229 when the bolt 230 is fully fastened. The surface 233 on the head 232 also contacts the inner edge of the outermost washer 227b to locate the washers 227a, 227b in the recess.

The face 243 of the pivot ring is provided with a plurality of circular recesses 244 which accommodate the heads 232 of the bolts 230 of each resilient means. Engagement of the heads 232 in the recesses 244 holds the pivot ring 214b rotationally fast with the main part 214a of the pressure plate.

Operation of the clutch 210 will now be described.

When the clutch release bearing 214 applies a clutch release travel 'L' to the radially inner ends of the fingers 225a, 225b, 225c of the diagram springs 215a, 215b, 215c, the clamp load exerted on the pressure plate 214 decreases and the pivot ring 214b tends to move axially away from the flywheel 211 as the radially inner ends of the spring fingers move axial inwardly to the dotted line position 225d.

As the pivot ring 214b moves away from the flywheel 211, the bias of the resilient means 226 reacting on the main part of the pressure plate 214a tends keeps the stack of clutch drive 219 and driven 220 plates clamped against the flywheel 211 so that the clamp load on the driven plates 220 is slowly reduced until the pivot ring 214b has moved axially away from the main part of the pressure plate 214a by a distance 'X', which is the maximum amount the belleville washer 227b extends beyond the base of the annular recess 242. Thereafter the pivot ring 214a continues to move axially away from the flywheel 211 and the rate at which the clamp load is removed increases.

When the clutch is engaged the reverse sequence of events takes place. As the pivot ring 214b is biased towards the flywheel, it contacts the resilient means 226 in the main part of the pressure plate 214a and clamps the stack of drive and driven plates against the flywheel 111 with the initial clamp load being cushioned by the resilient means 226.

As the clamp load of the diaphragm spring is increased the pivot ring 214b moves towards the main part of the pressure plate 214a against an increasing resistance from the resilient means 226 and so applying an increasing clamping force to the drive and driven plates. This continues until the pivot ring 214b abuts the main part of the pressure plate 214a at which point the full clamp load of the diaphragm spring means 215 is exerted on the stack of dive and driven plates fully clamping them between the pressure plate 214 and the flywheel 111.

FIG. 9 shows a modified resilient means 326 which can be used in any of the clutches 10, 110, 210 previously described. The resilient means 326 is essentially the same as the resilient means 26, 126, 226 described above except that the fastener is in the form of a nut 330 which is in screw threaded engagement with a threaded stud 343 formed on the pillar 329. A surface 333 of the nut 230 acts as a. stop surface for contact with an axial surface 334 on the pillar 329 when the nut 330 is fully fastened. The surface 333 extends over a radially inner portion of the recess 328 to hold the radially inner edges of the belleville washers 327a, 327b in the desired position.

FIG. 10 shows a further modified resilient means 426 which can also be used with any of the clutches 10, 110, 210 described above. Resilient means 426 comprises back to back belleville washers 427a, 427b arranged in a recess 428. The washers are held in the recess by a bolt 430 which is in screw threaded engagement with a threaded bore 431 formed in the base of the recess 428. In this arrangement there is no pillar in the recess and so no stop surface for the bolt to engage with. A surface 433 on the head of the bolt contacts the radially inner portion of the washer 427a to hold the washers 427a, 427b in the recess 428. The pre-load of the washers can be adjusted by varying the axial position of the surface 433 relative to the base of the recess 428 and/or by using shims in the base of the recess.

FIG. 11 shows a yet further modified resilient means 526 which can be used with the clutches 10, 110, 210 described above. Resilient means 526 comprises a coil spring 527 arranged in an annular recess 528. The coil spring 527 is located in the recess by a bolt 530 which is in screw threaded engagement with a pillar 529 in the centre of the recess 528. The head 532 of the bolt has an axial surface 533 which acts as a stop for engagement with the axial end face of the pillar 529. The surface 533 also acts as an abutment surface which co-operates with the coil spring 527 via a spring retention member 544. The retention member 544 has a first generally radially extending region 544a which is engaged by the surface 533 when the bolt 530 is fully fastened and the clutch id disengaged. As second generally radially extending region 544b of the retention member is connected to the first region by an axially extending region 544c and engages with the end of the spring 527 which protrudes from the recess 528. The spring retention member 544 in co-operation with the axial abutment surface 533 on the head 532 of the bolt 530 limits the maximum extent X by which the coil spring 527 protrudes from the recess 528 when the clutch is disengaged and also determines the pre-load of the spring. As with resilient means 26, the pre-load of the resilient means 526 can be adjusted by the use of shims 545 in the base of the annular recess 528. The second component in the clutch (not shown) is contacted by the coil spring 527 via the second radially extending region 544b of the spring retention member 544.

What is claimed is:

1. A friction clutch comprising a pressure plate, a counter pressure plate and at least one driven plate between the pressure plate and the counter pressure plate, the clutch further comprising spring means adapted to bias the pressure plate towards the counter pressure plate to clamp the at least one driven plate between the pressure plate and the counter pressure plate to engage the clutch, and means to cushion engagement of the clutch, the cushioning means comprise at least one resilient means arranged in a recess in a first component of the clutch, the at least one resilient means acting to bias a second components of the clutch away from the first component to provide the cushioning, the first and second components being rotationally fist and the or each resilient means being arranged to act on the second component via an insert mounted in a recess in the second component.

2. A friction clutch according to claim 1 in which the or each insert is made of a material having a low thermal conductivity.

3. A friction clutch according claim 1 in which the or each insert is made of a metallic material.

4. A friction clutch according to claim 3 in which the or each insert is made of stainless steel.

5. A friction clutch according to claim 1 in which a plurality of circumferentially spaced inserts are provided, each insert being arranged in a respective recess in the second component.

6. A friction clutch according to claim 5 in which each insert is annular in shape.

7. A friction clutch according to claim 6 in which each insert is in the form of a split ring.

8. A friction clutch according to claim 1 in which a single annular insert is provided.

9. A friction clutch according to claim 8 in which the resilient means comprises a single annular spring means.

10. A friction clutch according to claim 1, in which the resilient means for biasing the second component comprises a plurality of circumferentially spaced spring means.

11. A friction clutch as claimed in claim 1 in which the clutch is a multiplate plate friction clutch comprising a plurality of driven plates each located between axially separable drive plates.

12. A friction clutch as claimed in claim 11 in which the drive and driven plates are made of a carbon-carbon composite material.

13. A friction clutch as claimed in claim 11 in which the drive and driven plates are formed of a metal material.

14. A friction clutch as claimed in claim 13 in which at least one of the plates is faced with a sintered material.

15. A friction clutch as claimed in claim 1 in which the first component comprises a flywheel or pressure plate and the second component comprises a drive plate axially adjacent to and rotationally fast with the flywheel.

16. A friction clutch as claimed in claim 1 in which the clutch comprises a pressure plate having a first part and a second part which second part is mounted to the first part for rotation therewith, the first component comprising one of the first or second parts of the pressure plate, the second component comprising the other of the first or second parts.

17. A friction clutch as claimed in claim 16 in which the second part of the pressure plate comprises an annular pivot ring mounted in an annular recess in the first part of the pressure plate.

18. A friction clutch as claimed in claim 17 in which the first part of the pressure plate comprises the first component and the pivot ring comprises the second component, the recess or recesses for the resilient means being formed in the base of the annular recess in the first part which houses the pivot ring.

19. A friction clutch having means to cushion engagement of the clutch, the cushioning means comprising a plurality of circumferentially spaced resilient means arranged in one or more recesses in a first component of the clutch, each resilient means comprising a stack of two or more belleville washers, with a portion of the outermost washer in the stack protruding from the recess when the clutch is disengaged for contact with a second component of the clutch to provide the cushioning, each stack of washers being located on the first component by a respective fastener which is axially secured to the first component and which limits the amount by which the portion of the outermost washer protrudes from the recess when the clutch is disengaged.

20. A friction clutch as claimed in claim 19 in which the resilient means acts on the second component via an insert located in a recess in the second component.

21. A friction clutch as claimed in claim 19 in which the clutch is a multi-plate friction clutch comprising a plurality of driven plates, each located between axially separable drive plates.

22. A friction clutch having means to cushion engagement of the clutch, the cushioning means comprising a plurality of circumferentially spaced resilient means located in one or more recesses in a first component of the clutch and arranged to bias a second component of the clutch axially away from the first component to provide the cushioning, each resilient means being held in its recess by a fastener having an axial abutment means for limiting the amount by which the resilient means protrudes from the recess when the clutch is disengaged, the fastener being adapted to be axially secured to the first component with a stop on the fastener in abutment with a corresponding stop on the first component so as to locate the abutment means axially relative to the base of the recess.

23. A friction clutch as claimed in claim 22 in which the stop on first component is provided on a pillar in the recess about which a respective resilient means is mounted.

24. A friction clutch as claimed in claim 23 in which each resilient means is provided in a respective recess in the first component with the pillar being arranged substantially in the centre of its respective recess.

25. A friction clutch according to claim 22 in which there is a single annular recess formed in the first component with a plurality of circumferentially spaced pillars being provided in the recess, a respective resilient means being provided about each pillar.

26. A friction clutch as claimed in claims 23 in which the fastener comprises a screw threaded fastener which engages with a treaded portion of the pillar.

27. A friction clutch as claimed in claim 26 in which the fastener engages with a screw threaded bore in the pillar.

28. A friction clutch as claimed in claim 26 in which the screw threaded fastener has a head which is clamped against the axial face of the pillar, the axial abutment surface being provided on the side of the head facing the recess.

29. A friction clutches claimed in claim 23 in which the axial abutment surface is flush with the axial surface of the pillar when the fastener is fully tightened.

30. A friction clutch as claimed in claim 22 in which each resilient means comprises a stack of two or more back to hack Belleville washers with a portion of the outermost washer in the stack protruding from the recess when the clutch is disengaged for contact with the second component to provide the cushioning.

31. A friction clutch as claimed in claim 30 in which the abutment means contacts the outer most washer of its respective stack.

32. A friction clutch as claimed in claim 31 in which the axial abutment surface contacts an radially inner portion of the outermost washer, the arrangement being such that a radially outer portion of the outermost washer protrudes from the recess when the clutch is disengaged.

33. A friction clutch as claimed in claim 22 in which each resilient means comprises a coil spring.

34. A friction clutch as claimed in claim 33 in which each resilient means further comprises a spring retention member which is engaged by the abutment means when the clutch is disengaged and which engages an end of the spring which protrudes from the recess.

35. A friction clutch as claimed in claim 22 in which the cushioning pre-load is adjustable.

36. A friction clutch as claimed in claim 35 in which the pre-load is adjusted by varying the distance between the axial abutment means and the base of the recess when the stop on the fastener is fully tightened against the stop on the first component.

37. A fastener as claimed in claim 35 in which shims are provided in the base of the recess to vary the distance between the effective base of the recess and the axial abutment means.

38. A friction clutch as claimed in claim 22 in which the resilient means acts on the second component via an insert located in a recess in the second component.

39. A friction clutch as claimed in claim 22 in which the clutch is a multi-plate friction clutch comprising a plurality of driven plates, each located between axially separable drive plates.

* * * * *